(12) United States Patent
Chmaysani et al.

(10) Patent No.: US 11,318,778 B2
(45) Date of Patent: May 3, 2022

(54) SYSTEM FOR ASSISTING USE OF A WRITING INSTRUMENT

(71) Applicants: Rola Chmaysani, Oshawa (CA); Rania Chmaysani, Oshawa (CA)

(72) Inventors: Rola Chmaysani, Oshawa (CA); Rania Chmaysani, Oshawa (CA)

( * ) Notice: Subject to any disclaimer, the term of this patent is extended or adjusted under 35 U.S.C. 154(b) by 0 days.

(21) Appl. No.: 16/384,675

(22) Filed: Apr. 15, 2019

(65) Prior Publication Data
US 2020/0324568 A1  Oct. 15, 2020

(51) Int. Cl.
*B43K 23/004* (2006.01)
*G09B 11/02* (2006.01)

(52) U.S. Cl.
CPC ............ *B43K 23/004* (2013.01); *G09B 11/02* (2013.01)

(58) Field of Classification Search
CPC .. B43K 23/004; B43K 23/008; B43K 23/012; G09B 11/02
USPC .............................................. 401/8
See application file for complete search history.

(56) References Cited

U.S. PATENT DOCUMENTS 1,291,972 A  *  1/1919  McGuigan ........... B43K 23/016
                                                       401/88
7,252,450 B2 *  8/2007  Aguirre ................. B43K 25/00
                                                      224/267

\* cited by examiner

*Primary Examiner* — David P Angwin
*Assistant Examiner* — Bradley S Oliver
(74) *Attorney, Agent, or Firm* — David W Barman

(57) ABSTRACT

The invention provides a system and method for assisting in the holding and use of a writing instrument whereby an upper lower collar support a first and second strap utilized in the assistive process.

2 Claims, 3 Drawing Sheets

SYSTEM FOR ASSISTING USE OF A WRITING INSTRUMENT

BACKGROUND OF THE INVENTION

Although a vast amount of communication today utilizes a computer, there still is significant use of pens, pencils, and other writing utensils.

Most persons learn to use writing utensils at a very young age. However, a significant segment of persons with physical and developmental disorders struggle to engage in the seemingly simple activity of holding a writing utensil.

Assistive devices have fallen short mainly because they do not provide a configuration for successfully assisting in the learning of proper use of a writing instrument.

The present invention has solved this difficulty.

SUMMARY OF THE INVENTION

In one embodiment, the present invention is a system for assisting the holding and use of a writing instrument, said system comprising:

an upper collar and lower collar configured for removable attachment to a writing instrument;

at least two support straps attached to each of said upper collar and lower collar longitudinally along a writing instrument.

In one embodiment, the straps are elastically expandable.

In one embodiment, the system further includes a wrist strap.

In one embodiment, the upper collar and lower collar is configured to remain in a fixed position about the circumference of a writing instrument.

In one embodiment, a wrist strap is connected to said lower collar.

BREIF DESCRIPTION OF THE SEVERAL VIEWS OF THE DRAWINGS

Figure 3A:
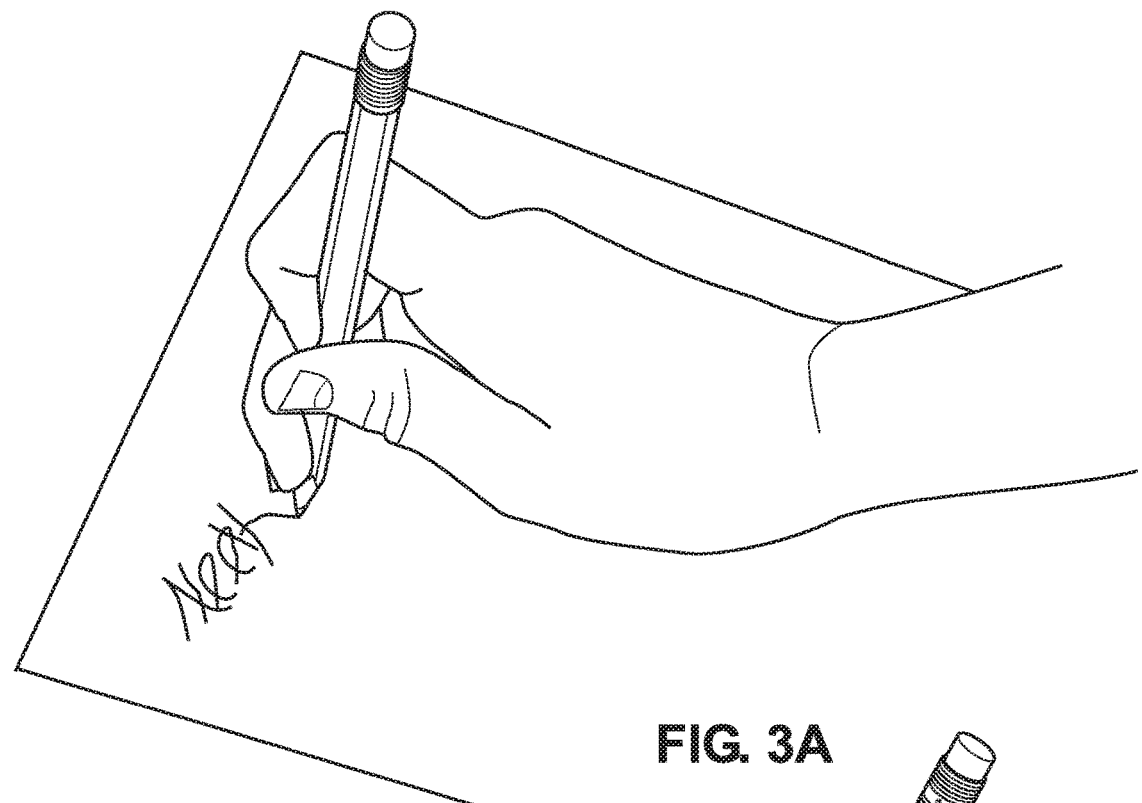

FIG. 3A demonstrates a person holding a writing instrument with great difficulty.

Figure 3B:
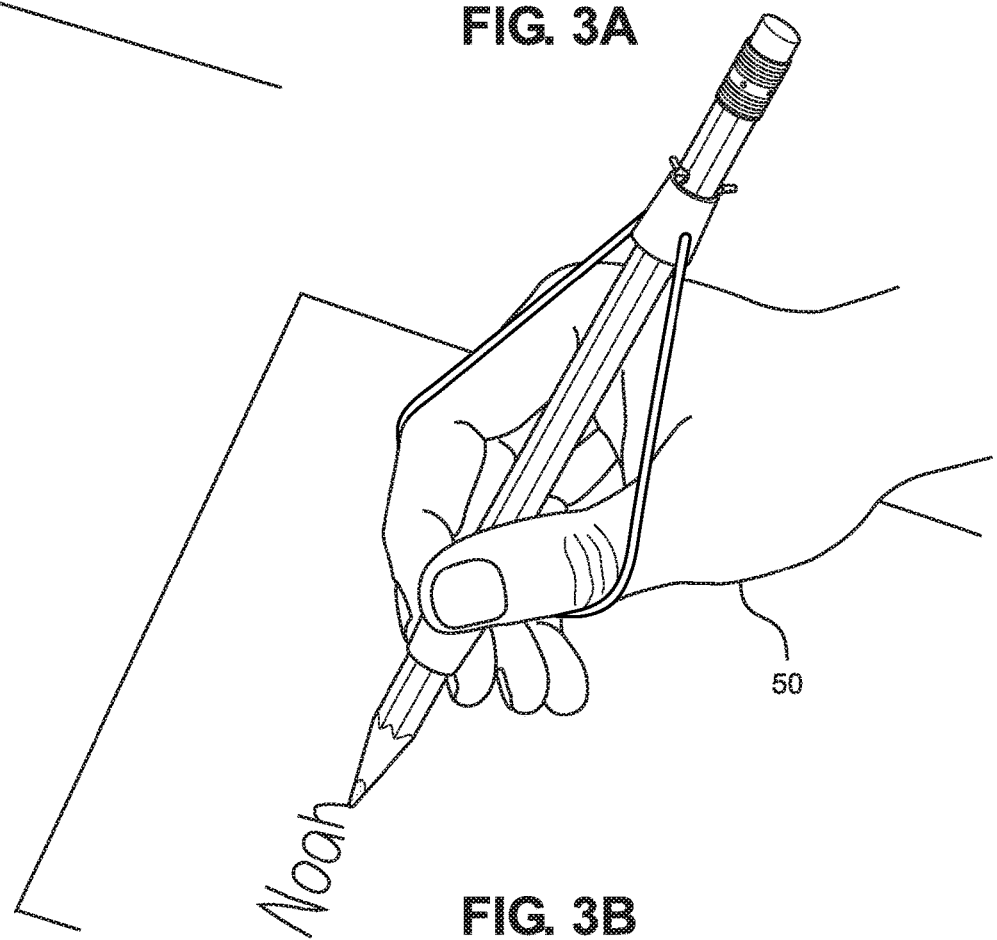

FIG. 3B shows environment of use depicting one embodiment of the present invention.

DETAILED DESCRIPTION OF THE PREFERRED EMBODIMENT

The present invention is a system and method relating to the assistance of learning to use and using a writing instrument. Writing instrument being commonly known as including but not limited to pens, pencils, markers, crayons, and all such related instruments.

Figure 1:
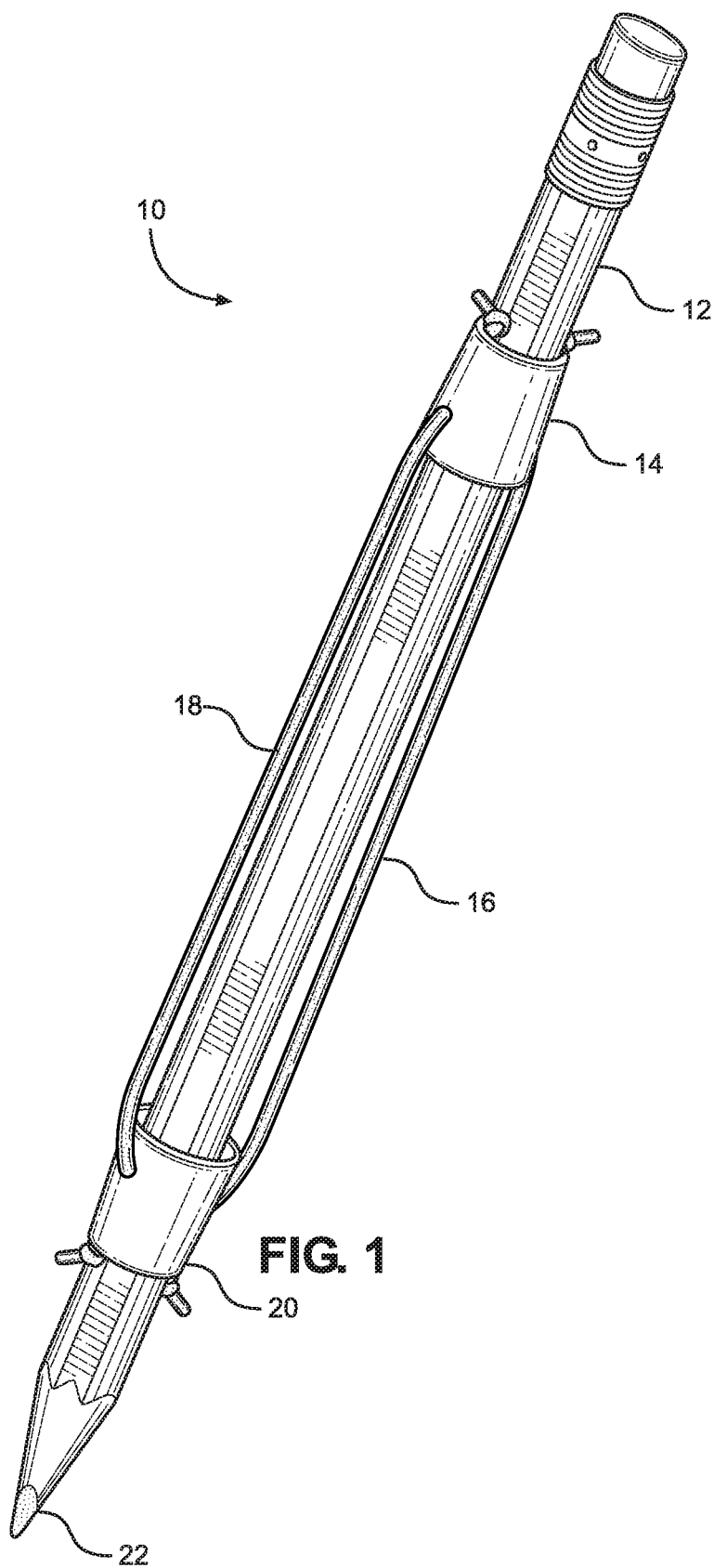
FIG. 1 is a side perspective view according to one embodiment of the present invention.

As demonstrated in FIG. 1, System 10 provides writing instrument 12 having and upper collar 14 and a lower collar 20.

The terms upper and lower being relative to writing point 22. As generally understood, in a writing instrument, there is writing point 22 that ultimately marks on a desired surface.

The system further includes a first guide strap 16 and second guide strap 18 each affixed to upper collar 14 in lower collar 20.

Figure 2:
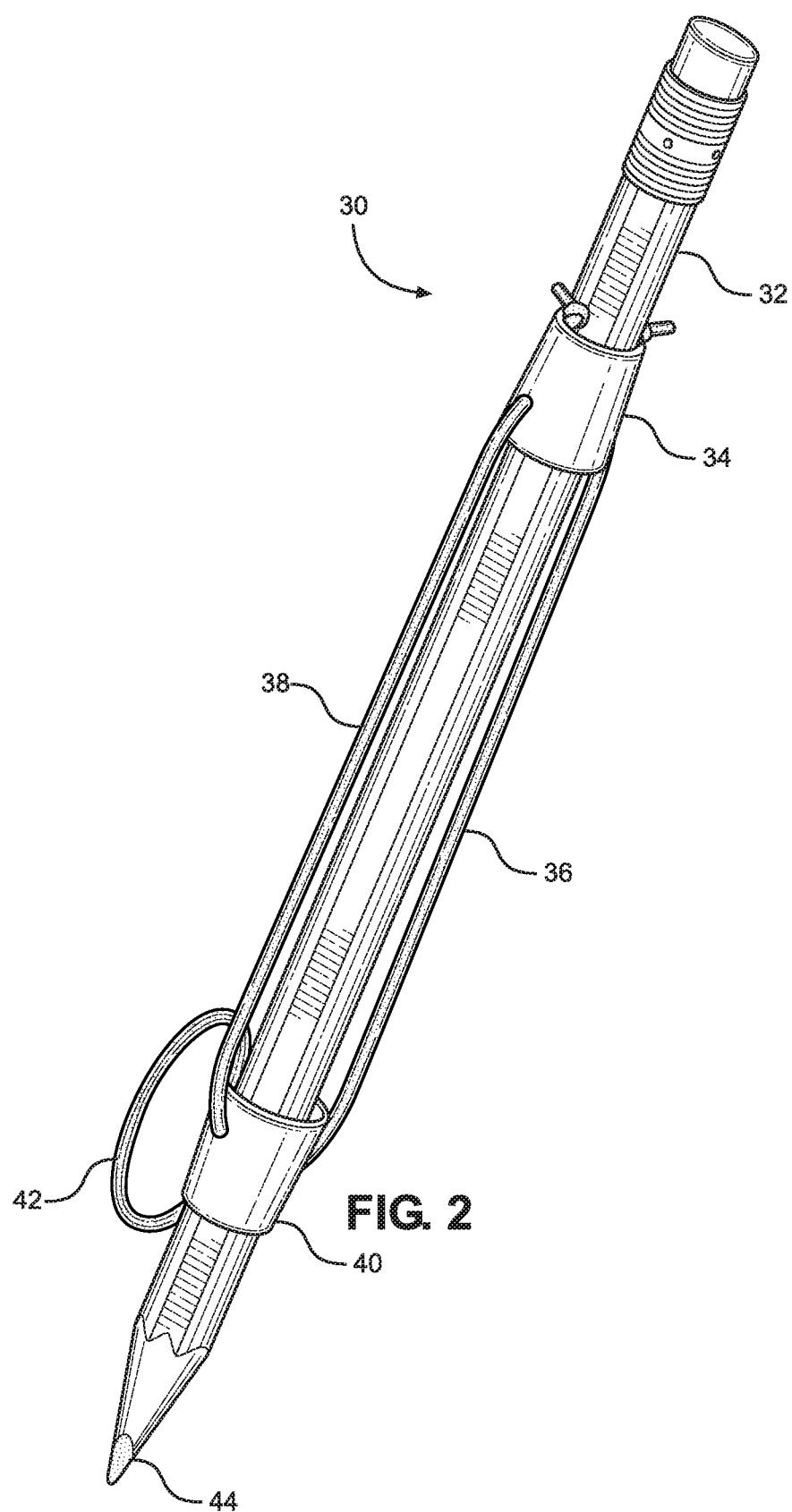
FIG. 2 is a site perspective view according to one embodiment of the present invention.

In the embodiment demonstrated in FIG. 2, System 30 has instrument 32 having and upper collar 34 and a lower collar 40. The terms upper and lower being relative to writing point 44. A first guide strap 36 and second guide strap 38 each affixed to upper collar 34 in lower collar 40. In this embodiment, support loop 42 emanates from lower collar 40 and is generally utilized by wrapping around the wrist of a user.

In providing the system of the present invention, as demonstrated in FIG. 3B, a user will hold the system in their hand 50 and each of first guide strap and second guide strap will assist and position a writing instrument in the writing process.

It is contemplated according to the present invention that the system be attachable and removable as desired providing that a single system is utilized with multiple writing instruments.

Attaching this system of the present invention to a writing instrument requires securing each of an upper collar and lower collar to a desired writing instrument. When a user decides to change writing instruments, they will detach each of an upper collar and lower collar and affix it to any desired writing instrument.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed:

1. A system for assisting the holding and use of a writing instrument, said system comprising:
    a first upper collar and a second lower collar configured for removable attachment to a writing instrument;
    at least two removable elastically expandable support straps attached to each of said first upper collar and second lower collar longitudinally along a writing instrument configured to position about the hand of a user when in use, wherein said at least two removable elastically expandable support straps emanate from said second lower collar forming a support loop configured to wrap around the wrist of a user.

2. The system of claim 1 wherein each of said first upper collar and second lower collar are configured to remain in a fixed position about the circumference of a writing instrument.

* * * * *